(12) United States Patent
Gharachedaghi et al.

(10) Patent No.: US 10,939,231 B2
(45) Date of Patent: Mar. 2, 2021

(54) GEOFENCING

(71) Applicant: Ooma, Inc., Sunnyvale, CA (US)

(72) Inventors: Afshin Gharachedaghi, Palo Alto, CA (US); Thaddeus White, Los Altos, CA (US); Alexander Ilin, Sunnyvale, CA (US); Alexander Rusin, Moscow (RU); Anthony Hizon, Mountain View, CA (US); Robert Mines, San Francisco, CA (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 16/457,815

(22) Filed: Jun. 28, 2019

(65) Prior Publication Data
US 2020/0413215 A1  Dec. 31, 2020

(51) Int. Cl.
*H04W 4/021* (2018.01)
(52) U.S. Cl.
CPC .................................. *H04W 4/021* (2013.01)
(58) Field of Classification Search
None
See application file for complete search history.

(56) References Cited

U.S. PATENT DOCUMENTS

| | | | |
|---|---|---|---|
| 9,788,160 B1* | 10/2017 | Gu | H04W 4/021 |
| 2011/0250875 A1* | 10/2011 | Huang | H04W 4/38 455/418 |
| 2012/0122418 A1* | 5/2012 | Hicks, III | G08B 25/001 455/404.1 |
| 2012/0192096 A1* | 7/2012 | Bowman | G06F 3/0481 715/780 |
| 2013/0085861 A1* | 4/2013 | Dunlap | H04W 4/021 705/14.58 |
| 2013/0275221 A1* | 10/2013 | Zeto, III | G06Q 30/0261 705/14.58 |
| 2015/0281889 A1* | 10/2015 | Menendez | H04W 4/021 455/456.1 |
| 2016/0081027 A1* | 3/2016 | Ganesh | H04W 48/02 370/311 |
| 2016/0094966 A1* | 3/2016 | Ledingham | H04W 4/70 455/404.2 |
| 2016/0275781 A1* | 9/2016 | Nold | G08B 25/008 |
| 2016/0342767 A1* | 11/2016 | Narasimhan | G06F 19/3456 |
| 2017/0072329 A1* | 3/2017 | Akavia | H04W 4/80 |
| 2019/0068687 A1* | 2/2019 | Masi | G06F 3/0483 |

\* cited by examiner

*Primary Examiner* — German Viana Di Prisco
(74) *Attorney, Agent, or Firm* — Carr & Ferrell LLP

(57) ABSTRACT

Methods and systems for determining a geofence has been crossed are provided. Exemplary methods include: configuring a plurality of services of a mobile operating system using respective application programming interfaces; receiving a wake up from the mobile operating system; getting a notification from a service of the plurality of services; confirming the geofence has been crossed; and notifying a backend that the geofence has been crossed.

22 Claims, 5 Drawing Sheets

US 10,939,231 B2

GEOFENCING

FIELD OF THE INVENTION

The present technology pertains to mobile computing, and more specifically to geofencing.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Mobile computing involves a computer which is expected to be transported during normal usage, which allows for transmission of data, voice, and video. Geofencing is the use of location technology to create a virtual geographic boundary.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for determining a geofence has been crossed. Specifically, a method for determining a geofence has been crossed may comprise: configuring a plurality of services of a mobile operating system using respective application programming interfaces; receiving a wake up from the mobile operating system; getting a notification from a service of the plurality of services; confirming the geofence has been crossed; and notifying a backend that the geofence has been crossed.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
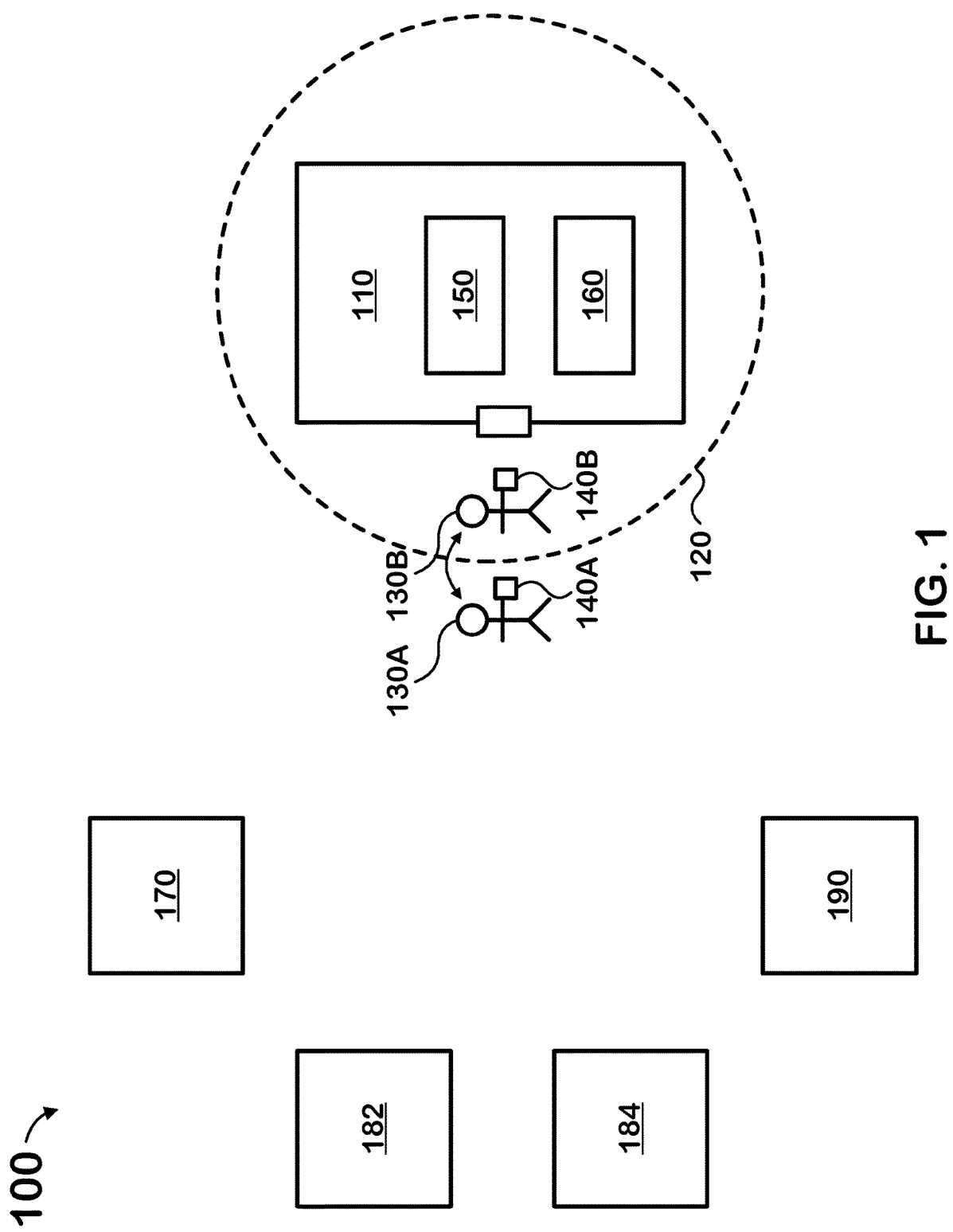
FIG. 1 is a simplified block diagram of a system for geofencing, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 for determining a geofence 120 has been crossed, according to some embodiments. System 100 can include home 110, geofence 120, resident 130 (depicted as outside of geofence 120 by resident 130A and inside of geofence 120 by resident 130B), mobile device 140 (depicted as outside of geofence 120 by mobile device 140A and inside geofence 120 by mobile device 140B), hub 150, beacon 160, significant geolocation 170, backend (or service data center) 182, (OS) data center 184, and alarm monitoring center 190. Home 110 can be a residential structure, such as a house, townhome, and the like. Typically, resident 130 inhabits home 110. More than one of resident 130, such as a family, can occupy home 110. Home 110 can be any structure, such as a commercial building. Resident 130 can have mobile device 140 on or about his/her person. Mobile device 140 can be a smartphone, phablet, tablet computer, and the like. Generally, mobile device 140 has wireless Internet access, such as services using 3G, 4G, 5G, etc. wireless mobile telecommunications technology.

Home 110 can include hub 150 and/or beacon 160. Hub 150 can communicate using wired (e.g., plain old telephone service (POTS), broadband Internet service such as cable, DSL, and the like) and wireless (e.g., Bluetooth, Wi-Fi, wireless Internet access, and the like) communications. For example, hub 150 can be used for telephone calls, such as by using POTS, Voice over Internet Protocol (VOIP), and the like. By way of further non-limiting example, hub 150 can communicate with backend 182 over a combination of wired and wireless communications. Additionally or alternatively, hub 150 can be (wirelessly) coupled to sensors (e.g., door, glass breakage, motion, fire, carbon monoxide, and the like sensors) inside home 110 and detect when the sensors are tripped/triggered.

In some embodiments, hub 150 can include a smart speaker, home automation integration (e.g., can control lighting, climate, entertainment systems, and appliances inside home 110), and the like. A smart speaker can be a type of wireless speaker and voice command device with an integrated virtual assistant that offers interactive actions and hands-free activation with the help of one or more "hot words." A virtual assistant can be a software agent that performs tasks or services for an individual based on verbal commands. For example, resident 130 can ask the virtual assistant questions, control home automation devices and media playback via voice, and manage other basic tasks such as email, to-do lists, and calendars with verbal commands.

Beacon 160 can include a Bluetooth (BT) radio transmitter. In some embodiments, beacon 160 can constantly transmit using Bluetooth Low Energy (BLE) the same signal or series of signals (e.g., data packets). Signals from beacon 160 can have a range of 5 meters to 20 meters. In various embodiments, mobile device 140 can receive the BLE signals from beacon 160. Beacon 160 can include a siren. Typically, beacon 160 is placed near an entrance/exit (e.g., front door, garage door, and the like) of home 110.

Geofence 120 is a virtual perimeter for a real-world geographic area. In some embodiments, geofence 120 can be a radius around a point location. For example, geofence 120 can be around home 110. In various embodiments, resident 130 can be determined to be "at home" (e.g., inside or on the premises of home 110) when resident 130 is inside an area circumscribed by geofence 120.

Significant geolocation 170 can be locations established by a mapping service as being significant. For example, significant geolocation 170 can be a major intersection (intersection of two major streets), business (e.g., a gas station, restaurant, etc.), and the like. Mobile device 140 uses a mobile operating system (e.g., iOS and Android). The provider of the mobile operating system (e.g., Apple Inc. and Google LLC) can provide the mapping service, among others. Additionally or alternatively, the provider of the mobile operating system can operate data center 184, for example, to provision services such as push notifications.

Backend 182 can be a facility that houses computing facilities like servers, routers, switches and firewalls, as well as supporting components like backup equipment, fire suppression facilities, and air conditioning. In various embodiments, backend 182 can be operated by a cloud computing service provider, such as Amazon.com, Inc., Microsoft Corporation, and Google LLC. Backend 182 can monitor when one (or more) resident(s) 130 crosses geofence 120 and keep track which of one (or more) resident(s) 130 is (are) present inside home 110.

Backend 182 can receive communications (e.g., notification and/or event) from hub 150 when an unexpected event occurs at home 110, such as a sensor being triggered (e.g., by an intruder/burglar, fire, and the like). In response, backend 182 can notify resident 130 of the unexpected event using email, short message service (SMS) text message, push notification, voice announcement inside home 110 using hub 150, and the like. Alternatively or additionally, backend 182 can communicate with hub 150 to turn on a siren, video camera, and the like inside home 110. Alternatively or additionally, backend 182 can communicate with alarm monitoring center 190.

According to various embodiments, when there is more than one of resident 130, backend 182 can keep track of the location (e.g., inside or outside of home 110) of each resident. For example, backend 182 will change the mode to away when the last resident leaves home 110 (crosses geofence 120) and there are no longer residents at home 110. By way of further example, backend 182 will change the mode to home when a first resident arrives at home 110 (crosses geofence 120) and prior to that no residents were present at home 110.

Data center 184 can be a facility that houses computing facilities like servers, routers, switches and firewalls, as well as supporting components like backup equipment, fire suppression facilities, and air conditioning. Data center 184 can be operated by the provider of the mobile operating system running on mobile device 140, for example, to provision services such as push notifications.

Alarm monitoring center (or central monitoring station) 190 can be notified of unexpected events at home 110 by backend 182. Typically, alarm monitoring center 190 is staffed by live operators who can communicate with resident 130 and emergency services as needed. For example, alarm monitoring center 190 can call resident 130 and/or a list of other contacts to confirm help is needed. When help is needed, alarm monitoring center 190 can communicate with police, fire, and medical services, as appropriate.

Each of home 110, backend (or service data center) 182, (OS) data center 184, and alarm monitoring center 190 can be in the same or different city, county, state, country, continent, etc. than the others of home 110, backend 182, (OS) data center 184, and alarm monitoring center 190.

Figure 2:
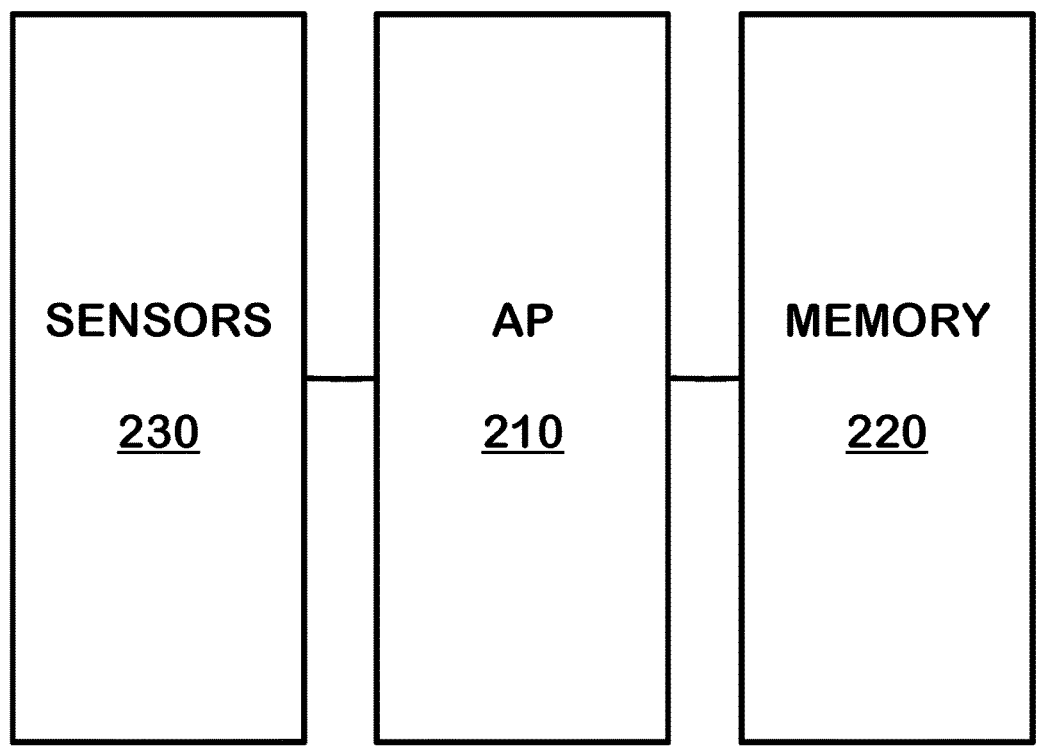
FIG. 2 is a simplified hardware block diagram of mobile device, according to various embodiments.

FIG. 2 illustrates mobile device 140C, according to some embodiments. Mobile device 140C can have at least some of the characteristics described above for mobile device 140 (depicted as mobile device 140A and 140B) in FIG. 1. Mobile device 140C can include application processor 210, memory 220, and sensors 230. Application processor 210 is an integrated circuit (IC) (also known as a "chip") used for primary application processing, in contrast with the ICs that handle functions such as the display, wireless communications and power management. For example, application processor 210 is a system on a chip (SoC), which is an integrated circuit that integrates multiple components of a computer. Such components can include multiple processor (typically ARM) cores, graphics processing units (GPUs), cache memories, memory controllers (e.g., for communicating with memory 220), audio and video encoders/decoders, USB host controllers, and the like. Processors generally are described in relation to FIG. 5.

Memory 220 can be volatile (e.g., dynamic random-access memory (DRAM) and/or static random-access memory (SRAM)), non-volatile (e.g., flash memory), and combinations thereof. Memory 220 can store information for use by application processor 210, such as an operating system and application. Memory 220 is described further in relation to FIG. 5. Mobile device 140C can include more or fewer resources, such as those described in relation to FIG. 5.

Sensors 230 can include a Global Positioning System (GPS) receiver, accelerometer, gyroscope, magnetometer, proximity sensor, ambient light sensor, microphone, and the like. A GPS receiver can receive information from GPS satellites which can be used to calculate the mobile device's (e.g., mobile devices 140A-C) geographical position.

Figure 3:
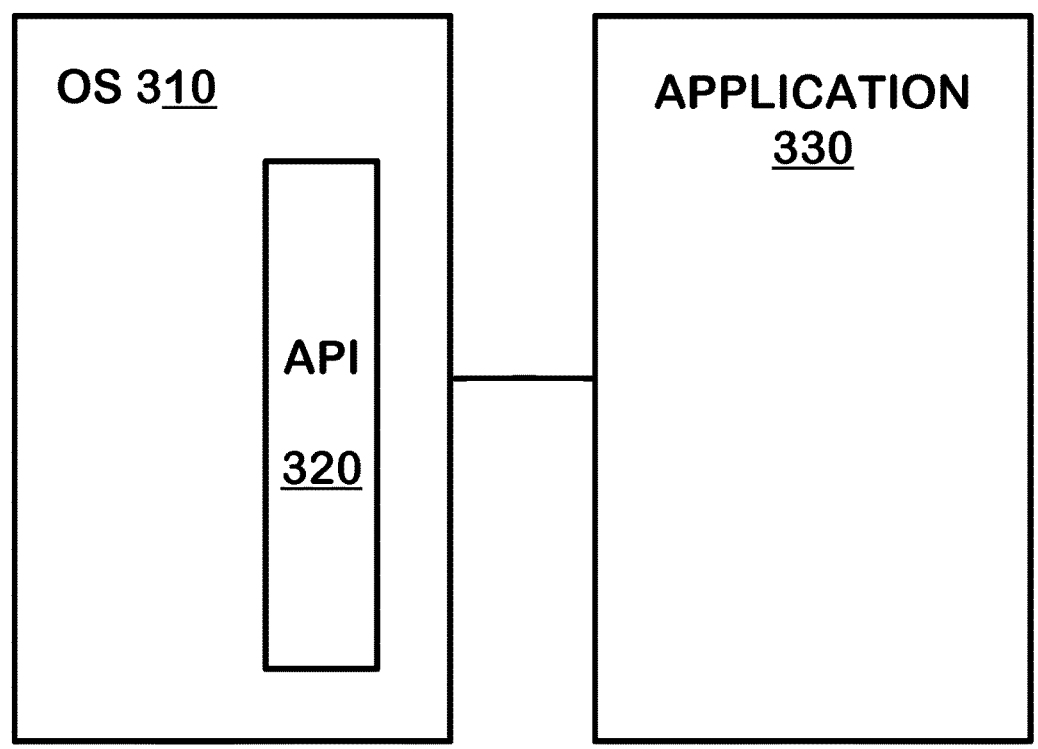
FIG. 3 is a simplified software block diagram of a mobile device, in accordance with some embodiments.

FIG. 3 depicts mobile device 140D, in accordance with some embodiments. Mobile device 140D can have at least some of the characteristics described above for mobile device 140 (depicted as mobile device 140A and 140B in FIG. 1) and mobile device 140C in FIG. 2. Mobile device 140D can include mobile operating system 310 and application 330. In some embodiments, mobile operating system 310 and application 330 are stored in memory 220 (FIG. 2) and executed/run by application processor 210.

Mobile operating system 310 is system software that manages hardware and software resources and provides common services for programs (e.g., application 330). Mobile operating system 310 can combine features of a personal computer operating system with other features useful for mobile, such as a wireless inbuilt modem and SIM tray for telephony and data connection, a touchscreen, cellular, Bluetooth, Wi-Fi Protected Access, Wi-Fi, Global Positioning System (GPS) mobile navigation, video- and single-frame picture cameras, speech recognition, voice recorder, music player, near field communication, and the like. For example, mobile operating system 310 is Apple iOS and/or Google Android.

Application programming interface (API) 320 is an interface between application 330 and mobile operating system 310. In various embodiments, application 330 communicates with mobile operating system 310 using API 320 to request services. Services can include geofence, GPS, network changeover, push notifications, beacon, and the like. Geofence service allows application 330 to specify a geofence (e.g., geofence 120 (FIG. 1), a radius around particular GPS coordinates or a street address) and then receive a (wake up and) notification from mobile operating system 310 when the geofence has been crossed. For example, using application 330, resident 130 (FIG. 1) specifies a small (e.g., 100 m), medium (e.g., 250 m), or large (e.g., 500 m) radius around an address associated with resident 130 (e.g., address of home 110) and requests notifications (registers interest in) when the geofence is crossed. Other radii can be used. Alternatively or additionally, a radius can be graphically received from resident 130 (FIG. 1) (e.g., finger motion to or away from home 110 on a map representation shrinks or expands the geofence circle).

The GPS service provides application 330 with a (real-time) location (e.g., GPS coordinates or other map location) of mobile device 140D using a GPS in mobile device 140D. Generally when application 330 uses the GPS service, mobile operating system 310 will not put application 330 to sleep (e.g., quiescent state) to manage power consumption (e.g., conserve battery life)

The network changeover service will (wake up) and notify application 330 (which registered interest) that a data network used by mobile device 140D has changed. For example, when the data network used by mobile device 140D switches from mobile internet to Wi-Fi, mobile operating system will wake up application 330 and notify it of the network change. Application 330 can check if the Wi-Fi network is the Wi-Fi network associated with (registered as) home 110.

The significant geolocation service will (wake up) and notify application 330 (which registered interest) that mobile device 140D is near significant geolocation 170. For example, the location of home 110 can be provided to the geolocation service and mobile operating system 310 will wake up and notify application 330 when mobile device is near a significant geolocation, the significant geolocation being nearby home 110.

A push notification is a message that is "pushed" from a backend server or application to user interface, such as application 330. For example, backend 182 (FIG. 1) can send a request—that a push notification be sent to mobile device 140—to data center 184. Data center 184 can send the requested push notification to mobile device 140 (FIG. 1).

The beacon service receives signals (packets) from a Bluetooth beacon, wakes up application 330 (which registered interest), and provides the packets to application 330.

Other services of mobile operating system 310 can be used. For example, the significant-change location service can be used. The significant-change location service relies on lower-power alternatives (such as Wi-Fi and cellular information) to determine the location of mobile device 140D. The significant-change location service (wakes up and) delivers location updates to application 330 when the position of mobile device 140D changes by a significant amount, such as 500 meters (or more).

According to various embodiments, services are not guaranteed by mobile operating system 310. For example, even though application 330 registers interest with the geofence service, application 330 may not be woken up until several minutes after (or not at all) the geofence has been crossed. Moreover, the accuracy of the location used by the geofence service may not be as accurate as a location determined using the GPS. By way of further example, even though application 330 registers interest with the network changeover service, application 330 may not be woken up until several minutes after (or not at all) the data network has changed. By way of additional example, application 330 may not be woken up until several minutes after (or not at all) a push notification is received and/or a beacon packet is received by mobile operating system 310.

Application 330 is software designed to perform a group of coordinated functions, tasks, or activities for the benefit of resident 130 (FIG. 1). In some embodiments, application 330 can be a security application which receives notifications/alerts for resident 130 of unexpected events in home 110 (FIG. 1). Notifications/alerts (e.g., email, short message service (SMS) text message, push notification, voice announcement inside home 110 using hub 150 (FIG. 1), and the like) can be provided by backend 182 (FIG. 1). Application 330 can be used to set modes which control how one or more of residents 130 receive notifications/alerts (at mobile device 140D). By way of non-limiting example, there can be home, away, and vacation modes, which can reflect whether or not resident 130 has crossed geofence 120 (FIG. 1) (e.g., resident 130 is in or on the premises of home 110 (FIG. 1)). In home mode, no notifications are sent (or hub 150 (FIG. 1) makes audible announcements). In away mode, notifications are sent by hub 150. In vacation mode, notifications can be sent to neighbors (or others in a list of contacts) instead of or in addition to resident 130.

Modes are useful for preventing resident 130 from receiving notifications/alerts when at home 110 and for sending resident 130 (FIG. 1) (and others) notifications/alerts when they are not at home 110. However, users (such as resident 130) do not want to manually change modes themselves. While the modes can be changed according to as a schedule, users can (and do) deviate from a schedule, resulting in an undesired mode. It would be advantageous for the modes to be set adaptively to the actual behavior of resident 130. Unfortunately, the geofence service is unreliable, since application 330 may be (woken up and) notified too late or not at all.

Figure 5:
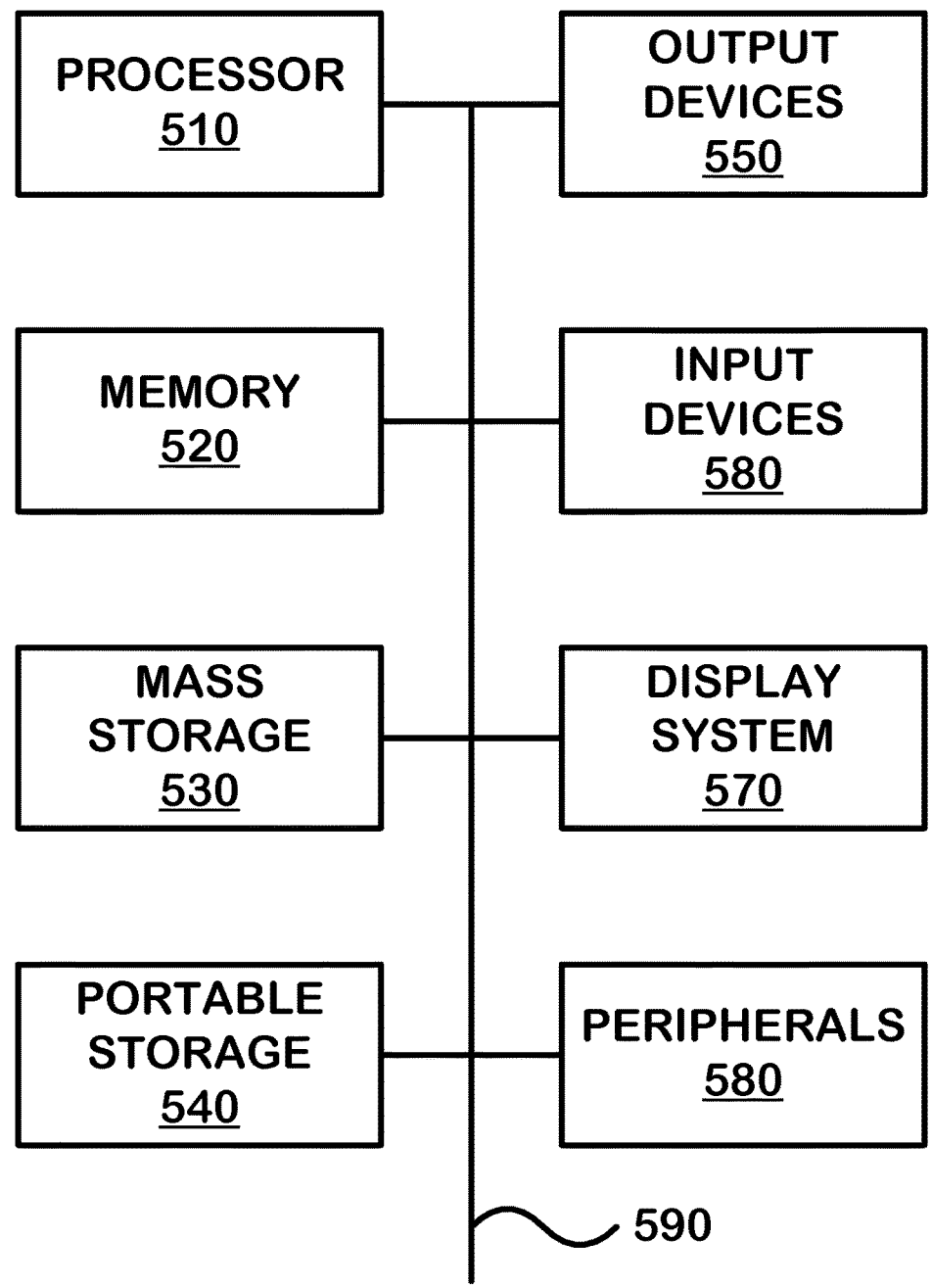
FIG. 5 is a simplified block diagram of a computing system, according to some embodiments.

To conserve battery life, application 330 (and most applications generally) are put to sleep (e.g., a quiescent state) by mobile operating system 310. While application 330 is asleep, it cannot wake itself up, determine its location, or take any other action. FIG. 5 illustrates a method for advantageously using multiple different services of mobile operating system 310 to wake up application 330 when it is likely mobile device 140D (and hence resident 130 (FIG. 1) had crossed geofence 120 (FIG. 1). By giving mobile device 140 multiple opportunities to be woken up and assess its location when it has likely crossed geofence 120, there is a higher probability a suitable mode for notifications/alerts can be set by backend 182.

Figure 4:
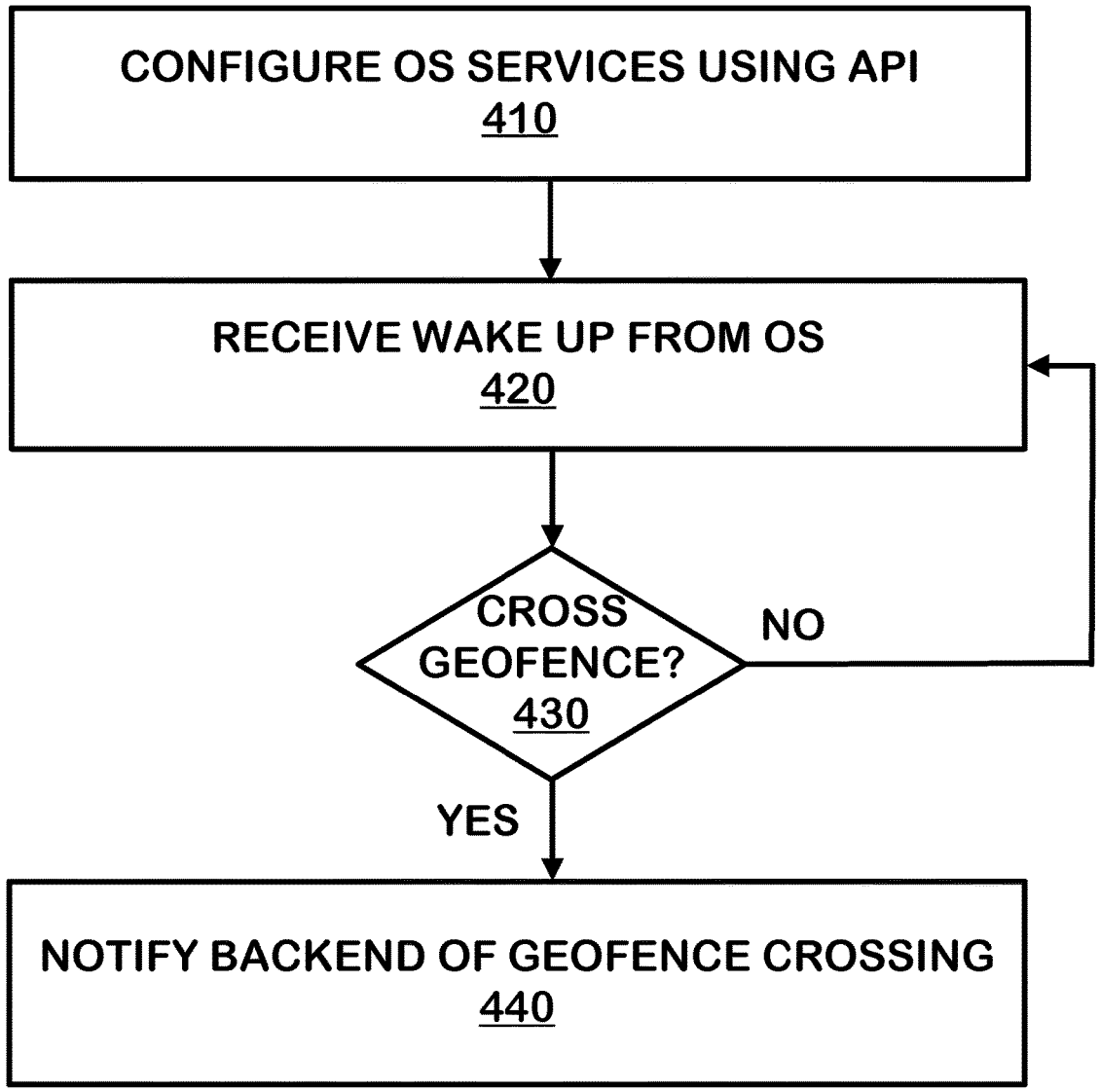
FIG. 4 is a simplified flow diagram of a method for determining a geofence has been crossed, in accordance with various embodiments.

FIG. 4 shows method 400 for determining a geofence has been crossed, according to some embodiments. Method 400 can be performed by mobile device 140 (FIG. 1), 140C (FIG. 2), and 140D (FIG. 3). Method 400 can commence at step 410 where mobile operating system services can be configured. For example, a geofence service can receive a radius around an address associated with resident 130 (FIG. 1) from application 330 (FIG. 3). Application 330 registers interest in an event of crossing the geofence. By way of further non-limiting example, application 330 registers to receive push notifications, application 330 registers interest with a network change service, a significant geolocation service, and/or a beacon service.

At step 420, a notification is received from a mobile operating system service. The mobile operating system service can be the mobile operating system service configured at step 410. In some embodiments, mobile operating system 310 wakes up application 330 and provide it with information from the service. For example, the geofence service notifies application 330 that mobile device 140D crossed a geofence, the push notification service provides a push notification that was received, the network change service notifies application 330 that the data network used by mobile device 140 has changed, the significant geolocation service notifies application 330 that mobile device 140D is near a significant geolocation, the beacon service notifies application 330 that mobile device 140D has received signals (packets) from beacon 160 (FIG. 1), the significant-change location service notifies mobile device 140 has traveled a significant distance (e.g., from home 110), and the like.

When application 330 is woken up by mobile operating system 310, application 330 has very little time to operate before mobile operating system 310 puts it to sleep again, to conserve battery power. In some embodiments, application 330 has 10 seconds or less to run before it is put to sleep. According to various embodiments, application 330 has less than 1 second.

At step 430, whether the geofence was crossed is determined. In other words, did the mobile device (e.g., mobile device 140 (FIG. 1), 140C (FIG. 2), and 140D (FIG. 3)) enter/exit an area circumscribed by geofence 120 (FIG. 1), enter/exit home 110 (FIG. 1), and the like. When the geofence is crossed, method 400 can proceed to step 440. When the geofence is not crossed, method 400 can return to step 420.

In some embodiments, the GPS service is used to determine a location of the mobile device with a high level of accuracy. The GPS location can be used to establish whether the geofence was crossed. According to various embodiments, the GPS service can continue to be used through step 440, so that step 440 can be completed without mobile operating system 310 putting application 330 to sleep. Additionally or alternatively, when the notification is from the change network service, application 330 can check if the present data network is the Wi-Fi network associated (registered) with home 110. Additionally or alternatively, when the notification is from the beacon service, application 330 can check if the beacon is a beacon associated (registered) with home 110.

At step 440, the confirmed geofence crossing is reported to backend 182. In response to the confirmed geofence crossing, backend 182 can change the mode. Additionally or alternatively, backend 182 can use the geofence crossing information to determine which residents are at home 110 (FIG. 1) and those who are not.

The information about who is at home 110 can be used by backend 182 to reduce the number of false alarms. For example, when resident 130 is at home 110, it is less likely that a burglar has broken into home 110. By way of further example, the information about who is at home 110 can be used to contact resident 130 at home 110, who may have inadvertently triggered the false alarm. Alternatively or additionally, the information about who is at home 110 can be used supplement information available to first responders in an emergency. For example, in the event of a fire, the firefighters can be notified about residents in home 110. By way of additional example, in the event of a hostage situation, law enforcement can be notified of residents in home 110.

FIG. 5 illustrates an exemplary computer system 500 that may be used to implement some embodiments of the present invention. The computer system 500 in FIG. 5 may be implemented in the contexts of the likes of computing systems, networks, servers, or combinations thereof. The computer system 500 in FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 in FIG. 5 further includes a mass data storage 530, portable storage device 540, output devices 550, user input devices 560, a graphics display system 570, and peripheral device(s) 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 in FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system.

Some of the components provided in the computer system 500 in FIG. 5 can be those typically found in computer systems that may be suitable for use with embodiments of the present disclosure and are intended to represent a broad category of such computer components. Thus, the computer system 500 in FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for determining a geofence has been crossed, the method comprising:
   configuring a plurality of services of a mobile operating system using respective application programming interfaces to determine when a geofence has likely been crossed by a mobile device running the mobile operating system;
   receiving a wake up of a mobile application from the mobile operating system, wherein the wake up results from a response generated by a backend server as a result of the backend server receiving a communication from a device within the geofence;
   getting a notification from a service of the plurality of services;
   confirming the geofence has been crossed using a Global Positioning System service to determine an accurate location;
   using the Global Positioning System service until the notifying a backend service data center is completed and thereby keeping the mobile operating system from putting the mobile application asleep;
   notifying the backend service data center associated with at least one of the plurality of services that the geofence has been crossed; and
   sleeping the mobile application after the notifying is complete.

2. The computer-implemented method of claim 1, wherein:
   the plurality of services includes a geofence service; and
   configuring the geofence service includes defining an area about an address associated with the geofence.

3. The computer-implemented method of claim 1, wherein:
   the plurality of services includes a push notification service; and
   the notification is a push notification received from a data center associated with a provider of the mobile operating system, the data center receiving a request from the backend server, the backend server sending the request in response to a sensor within the geofence being triggered.

4. The computer-implemented method of claim 1, wherein:
   the plurality of services includes a network change service; and
   confirming the geofence has been crossed includes checking that a network connection is to a Wi-Fi network registered with a location, the location being associated with the geofence.

5. The computer-implemented method of claim 1, wherein:
   the plurality of services includes a beacon service;
   the notification includes a signal from a Bluetooth beacon; and
   confirming the geofence has been crossed includes checking the Bluetooth beacon is registered with a location associated with the geofence.

6. The computer-implemented method of claim 1, wherein:
   the plurality of services includes a significant-change location service.

7. The computer-implemented method of claim 1, wherein:
   confirming the geofence has been crossed includes using an accelerometer to determine that there is movement.

8. The computer-implemented method of claim 1, wherein:
   the backend service data center changes a notification mode in response to the geofence being crossed.

9. The computer-implemented method of claim 1, wherein:
   the mobile operating system is at least one of Apple iOS and Google Android.

10. The computer-implemented method of claim 1, wherein the device within the geofence is a hub.

11. The computer-implemented method of claim 1, wherein the device within the geofence is a motion sensor or door alarm.

12. A system for determining a geofence has been crossed, the system comprising:
   a processor; and
   a memory communicatively coupled to the processor, the memory storing instructions executable by the processor to perform a method comprising:
      configuring a plurality of services of a mobile operating system using respective application programming interfaces to determine when a geofence has likely been crossed by a mobile device running the mobile operating system;

receiving a wake up of a mobile application from the mobile operating system, wherein the wake up results from a response generated by a backend server as a result of the backend server receiving a communication from a device within the geofence;

getting a notification from a service of the plurality of services;

confirming the geofence has been crossed using a Global Positioning System service to determine an accurate location;

using the Global Positioning System service until the notifying is completed and thereby keeping the mobile operating system from putting the service asleep;

sleeping the service after the notifying is complete; and notifying a backend service data center associated with at least one of the plurality of services that the geofence has been crossed.

13. The system of claim 12, wherein:

the plurality of services includes a geofence service; and configuring the geofence service includes defining an area about an address associated with the geofence.

14. The system of claim 12, wherein:

the plurality of services includes a push notification service; and the notification is a push notification received from a data center associated with a provider of the mobile operating system, the data center receiving a request from the backend server, the backend server sending the request in response to a sensor within the geofence being triggered.

15. The system of claim 12, wherein:

the plurality of services includes a network change service; and confirming the geofence has been crossed includes checking that a network connection is to a Wi-Fi network registered with a location, the location being associated with the geofence.

16. The system of claim 12, wherein:

the plurality of services includes a beacon service;

the notification includes a signal from a Bluetooth beacon; and confirming the geofence has been crossed includes checking the Bluetooth beacon is registered with a location associated with the geofence.

17. The system of claim 12, wherein:

the plurality of services includes a significant-change location service.

18. The system of claim 12, wherein:

confirming the geofence has been crossed includes using an accelerometer to determine that there is movement.

19. The system of claim 12, wherein:

the backend service data center changes a notification mode in response to the geofence being crossed.

20. The system of claim 12, wherein the device within the geofence is a hub.

21. The system of claim 12, wherein the device within the geofence is a motion sensor or door alarm.

22. A system for determining a geofence has been crossed, the system comprising:

means for configuring a plurality of services of a mobile operating system using respective application programming interfaces to determine when a geofence has likely been crossed by a mobile device running the mobile operating system;

means for receiving the wake up from the mobile operating system, wherein the means for receiving the wake up is in response to a backend server notification or message as a result of the backend server receiving a communication from a device within the geofence;

means for getting a notification from a service of the plurality of services;

means for confirming the geofence has been crossed using a Global Positioning System service to determine an accurate location;

means for using the Global Positioning System service until the notifying of a backend service data center is completed; and means for notifying the backend service data center associated with at least one of the plurality of services that the geofence has been crossed; and means for sleeping the mobile application after the notifying is complete.

* * * * *